US008559297B2

(12) United States Patent
Kawamura et al.

(10) Patent No.: US 8,559,297 B2
(45) Date of Patent: Oct. 15, 2013

(54) USER APPARATUS, BASE STATION APPARATUS, AND COMMUNICATION CONTROL METHOD FOR CONTROLLING COVERAGE AREA AND DATA RATE ACCORDING TO ENVIRONMENTS

(75) Inventors: Teruo Kawamura, Yokosuka (JP); Yoshihisa Kishiyama, Yokosuka (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 365 days.

(21) Appl. No.: 12/935,031

(22) PCT Filed: Mar. 25, 2009

(86) PCT No.: PCT/JP2009/055961
§ 371 (c)(1),
(2), (4) Date: Dec. 3, 2010

(87) PCT Pub. No.: WO2009/119671
PCT Pub. Date: Oct. 1, 2009

(65) Prior Publication Data
US 2011/0164532 A1    Jul. 7, 2011

(30) Foreign Application Priority Data

Mar. 28, 2008   (JP) ................................ 2008-088105

(51) Int. Cl.
*H04B 7/208* (2006.01)
*H04J 11/00* (2006.01)
*H04K 1/10* (2006.01)

(52) U.S. Cl.
USPC ........... 370/210; 370/344; 370/480; 370/482; 375/260

(58) Field of Classification Search
None
See application file for complete search history.

(56) References Cited

U.S. PATENT DOCUMENTS

| 7,394,864 B2* | 7/2008 | Webster et al. ................ 375/295 |
| 2006/0077931 A1* | 4/2006 | Lee et al. ........................ 370/329 |
| 2007/0004465 A1* | 1/2007 | Papasakellariou et al. ... 455/571 |
| 2007/0218942 A1* | 9/2007 | Khan et al. ................. 455/553.1 |
| 2009/0052427 A1* | 2/2009 | Oketani et al. ................ 370/347 |

(Continued)

FOREIGN PATENT DOCUMENTS

| EP | 1 998 586 A1 | 12/2008 |
| JP | 2007-151059 A | 6/2007 |

(Continued)

OTHER PUBLICATIONS

International Search Report w/translation and "corrected version" from PCT/JP2009/055961 dated May 19, 2009 (5 pages).

(Continued)

*Primary Examiner* — Yemane Mesfin
*Assistant Examiner* — Christine Duong
(74) *Attorney, Agent, or Firm* — Osha Liang LLP (57) ABSTRACT

A user apparatus to which radio access schemes of a single-carrier scheme and a multicarrier scheme are applied includes: a radio access scheme setting unit configured to set a radio access scheme; a discrete Fourier transform unit configured to perform discrete Fourier transform on a modulated symbol sequence when the radio access scheme is the single-carrier scheme; a serial parallel conversion unit configured to perform serial parallel conversion on the modulated symbol sequence when the radio access scheme is the multicarrier scheme; a frequency domain signal generation unit configured to assign radio resources to the modulated symbol sequence on which discrete Fourier transform has been performed or to the demodulated symbol sequence on which serial parallel conversion has been performed so as to generate a signal in the frequency domain; a waveform shaping filter configured to perform waveform shaping on the signal in the frequency domain; a transmission signal generation unit configured to perform inverse fast Fourier transform on the signal in the frequency domain on which waveform shaping has been performed so as to generate a transmission signal; and a transmission unit configured to transmit the transmission signal by radio.

16 Claims, 7 Drawing Sheets

(56) References Cited

U.S. PATENT DOCUMENTS

| | | |
|---|---|---|
| 2009/0227261 A1* | 9/2009 | Tiirola et al. .................. 455/450 |
| 2009/0227263 A1* | 9/2009 | Agrawal et al. ............ 455/452.1 |
| 2009/0232194 A1 | 9/2009 | Yoshida |
| 2010/0091919 A1* | 4/2010 | Xu et al. ........................ 375/346 |
| 2010/0103854 A1* | 4/2010 | Lee et al. ...................... 370/312 |

FOREIGN PATENT DOCUMENTS

| | | |
|---|---|---|
| WO | 2007/029406 A1 | 3/2007 |
| WO | WO2007/029406 * | 3/2007 |
| WO | 2007/111187 A1 | 10/2007 |

OTHER PUBLICATIONS

Written Opinion from PCT/JP2009/055961 dated May 19, 2010 (4 pages).
R. Dinis et al.; "A Multiple Access Scheme for the Uplink of Broadband Wireless Systems"; IEEE Globecom; pp. 3808-3812; Dec. 2004 (5 pages).
Office Action for Japanese Patent Application No. 2008-088105 mailed Jun. 12, 2012, with English translation thereof (4 pages).
Patent Abstract for Japanese Publication No. 2007-151059 published Jun. 14, 2007 (1 page).

* cited by examiner

| ACCESS SCHEME | SINGLE-CARRIER SCHEME | MULTICARRIER SCHEME |
|---|---|---|
| ROLL-OFF FACTOR | LARGE ⇔ SMALL | 0 |
| PAPR (COVERAGE AREA) | SMALL ⇔ LARGE<br>WIDE ⇔ NARROW | LARGE<br>NARROW |
| PEAK DATA RATE | SMALL ⇔ LARGE | LARGE |

FIG.6

USER APPARATUS, BASE STATION APPARATUS, AND COMMUNICATION CONTROL METHOD FOR CONTROLLING COVERAGE AREA AND DATA RATE ACCORDING TO ENVIRONMENTS

TECHNICAL FIELD

The present invention relates to a radio communication system. More particularly, the present invention relates to a user apparatus, a base station apparatus and a communication control method.

BACKGROUND ART

3GPP that is a standardization group of W-CDMA is studying a communication scheme that becomes a successor to W-CDMA (Wideband Code Division Multiple Access) and HSPA (High Speed Packet Access), that is, 3GPP is studying Evolved UTRA and UTRAN (another name: (LTE) (Long Term Evolution) or Super 3G). For example, OFDMA (Orthogonal Frequency Division Multiple Access) is adopted for downlink, and SC-FDMA (Single-carrier Frequency Division Multiple Access) is adopted for uplink.

OFDMA is a scheme for dividing a frequency band into a plurality of narrow frequency bands (subcarriers) so as to perform transmission by carrying data on each subcarrier. In OFDMA, by arranging the subcarriers on frequencies densely without interfering with each other while a part of them overlaps, high speed transmission is realized so that efficiency of use of frequency increases.

SC-FDMA is a single-carrier transmission scheme that can decrease interference among terminals by dividing frequency band and performing transmission using frequency bands that are different among a plurality of terminals. Since the SC-FDMA has characteristics that variation of transmission power becomes small, low power consumption in the terminal and wide coverage can be realized (refer to R. Dinis et al., "A Multiple Access Scheme for the Uplink of Broadband Wireless Access," IEEE Globecom, December 2004, for example).

SC-FDMA used for uplink radio access in E-UTRA is described with reference to FIG. 1. The frequency band usable in the system is divided into a plurality of resource blocks. Each of the resource blocks includes one or more subcarriers. One or more resource blocks are assigned to the user apparatus (UE: User Equipment). In frequency scheduling, according to received signal quality or channel state information (CQI: Channel Quality Indicator) of each resource block in the uplink for each user apparatus measured by the base station apparatus, the base station apparatus assigns resource blocks preferentially to a user apparatus of a good channel state, so that transmission efficiency or throughput of the whole system can be improved. Also, frequency hopping may be applied for changing usable frequency blocks according to a predetermined frequency hopping pattern.

Figure 1:
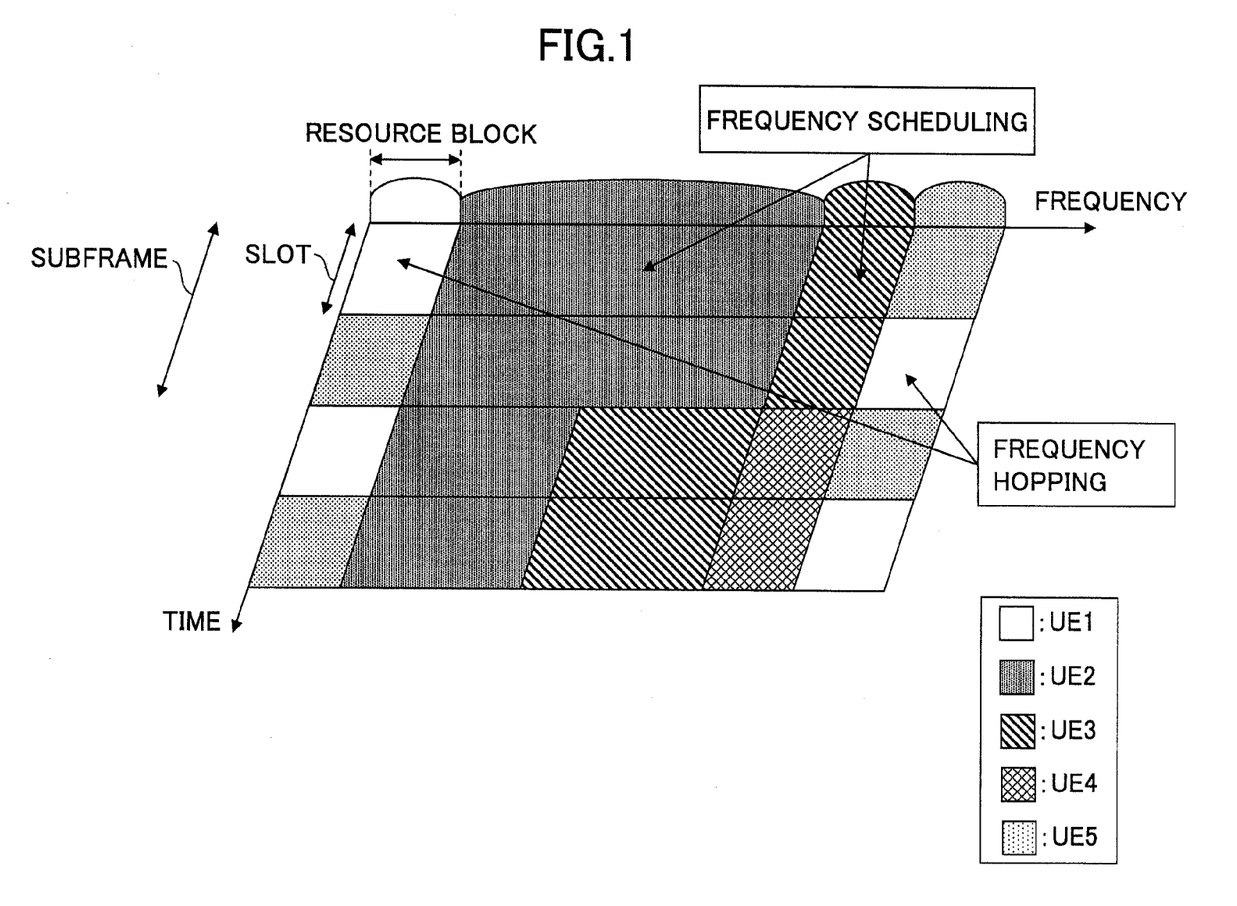
FIG. 1 is an explanatory diagram showing single-carrier—FDMA.

In FIG. 1, different hatchings indicate time/frequency resources assigned to different user apparatuses. UE2 assigned a wide band in a subframe is assigned a narrow band in a next subframe. Each user apparatus is assigned a different frequency band such that frequency bands do not overlap.

In SC-FDMA, each user apparatus in a cell performs transmission using different time/frequency resources. Accordingly, orthogonality among user apparatuses in the cell can be realized. In SC-FDMA, by assigning continuous frequency, single-carrier transmission of low PAPR (Peak-to-Average Power ratio) can be realized. Therefore, coverage area can be increased in the uplink in which there is strict limitation for transmission power. In SC-FDMA, a scheduler of the base station apparatus determines the time/frequency resources to be assigned based on propagation status of each user and QoS (Quality of Service) of data to be transmitted. QoS includes data rate, required error rate and delay. Accordingly, by assigning time/frequency resources of good propagation status to each user, throughput can be increased.

DISCLOSURE OF THE INVENTION

Problem to be Solved by the Invention

Study of communication schemes is starting in the radio communication system of next generation of Evolved UTRA and UTRAN. The next generation communication scheme may be called IMT-Advanced (International Mobile Telecommunication-Advanced) or 4G (4th generation).

In the next generation communication system, communications under various environments should be supported. For example, in the various environments, major extending environments include a micro cell, an indoor cell, and a hot spot cell.

Figure 2:
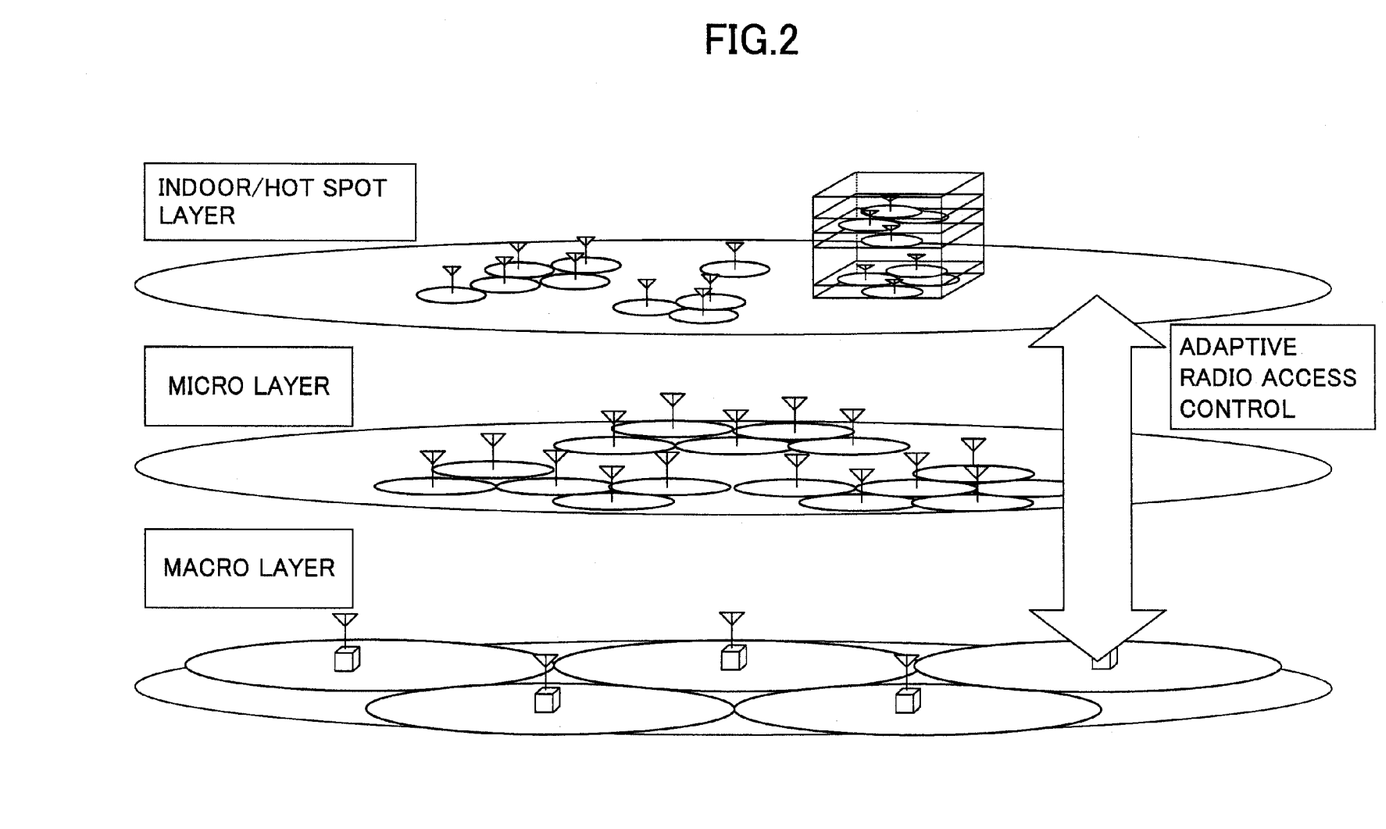
FIG. 2 is an explanatory diagram showing requirements for uplink.

In addition, in the next generation radio communication system, it is required to provide services according to various environments and required QoS and the like. The services include support for various traffic required speed-up of data rate and QoS requirements. In addition, it is required to increase the coverage area. For example, the various environments include a macro cell, a micro cell, an indoor cell, and a hot spot cell as shown in FIG. 2. FIG. 2 shows an indoor/hot spot layer that includes indoor cells/hot spot cells, a micro layer that includes micro cells, and a macro layer that includes macro cells. In the next generation radio communication system, communications under these various environments should be supported. In addition, QoS includes data rate, required error rate, delay and the like. Data rate may be called throughput.

In addition, in the next generation radio communication system, it is required to reduce network cost. For example, it is achieved by increasing transmission capacity and by realizing wide coverage area.

In addition, it is desirable that the next generation radio communication system is compatible with the 3G (3rd Generation) system. For example, it is desirable to realize full support of E-UTRA, and handover between the next generation radio communication system and the existing 3G system such as W-CDMA and E-UTRA.

In the above-mentioned requirements, from the viewpoint of increasing user throughput to be greater than that of the system to which E-UTRA is applied, it is preferable to use, in the uplink, the multicarrier scheme instead of the single-carrier scheme applied to E-UTRA. The reason is that, for example, when applying single user MIMO (Multiple Input Multiple Output) for realizing high speed transmission, the OFDM based multicarrier scheme which has superior tolerance to multipath interference is superior.

On the other hand, from the viewpoint of realizing wide coverage area, the single-carrier scheme that can reduce PAPR is preferable. From the viewpoint of satisfying the requirement of full support of E-UTRA, the single-carrier scheme is preferable.

In view of the above-mentioned problems, an object of the present invention is to provide a user apparatus, a base station apparatus and a communication control method that can control the coverage area and the data rate according to environments.

Means for Solving the Problem

For solving the problem, the user apparatus is a user apparatus to which radio access schemes of a single-carrier scheme and a multicarrier scheme are applied, including:

a radio access scheme setting unit configured to set a radio access scheme;

a discrete Fourier transform unit configured to perform discrete Fourier transform on a modulated symbol sequence when the radio access scheme set by the radio access scheme setting unit is the single-carrier scheme;

a serial parallel conversion unit configured to perform serial parallel conversion on the modulated symbol sequence when the radio access scheme set by the radio access scheme setting unit is the multicarrier scheme;

a frequency domain signal generation unit configured to assign radio resources to the modulated symbol sequence on which discrete Fourier transform has been performed by the discrete Fourier transform unit or to the demodulated symbol sequence on which serial parallel conversion has been performed by the serial parallel conversion unit so as to generate a signal in the frequency domain;

a waveform shaping filter configured to perform waveform shaping on the signal in the frequency domain generated by the frequency domain signal generation unit;

a transmission signal generation unit configured to perform inverse fast Fourier transform on the signal in the frequency domain on which waveform shaping has been performed by the waveform shaping filter so as to generate a transmission signal; and a transmission unit configured to transmit the transmission signal generated by the transmission signal generation unit by radio.

The base station apparatus is a base station apparatus that communicates with a user apparatus to which radio access schemes of a single-carrier scheme and a multicarrier scheme are applied, including:

a radio access scheme setting unit configured to set a radio access scheme to be used by the user apparatus;

a waveform shaping condition setting unit configured to set a waveform shaping condition based on which the user apparatus performs waveform shaping, according to the radio access scheme set by the radio access scheme setting unit; and a reporting unit configured to report, by radio, information indicating the radio access scheme set by the radio access scheme setting unit and the waveform shaping condition set by the waveform shaping condition setting unit.

The communication control method is a communication control method in a radio communication system including a user apparatus to which radio access schemes of a single-carrier scheme and a multicarrier scheme are applied, and a base station apparatus that communicates with the user apparatus, including:

a step in which the base station apparatus sets a radio access scheme to be used by the user apparatus;

a step in which the base station apparatus sets a waveform shaping condition based on which the user apparatus performs waveform shaping, according to the radio access scheme set in the step of setting the radio access scheme;

a step in which the base station apparatus reports, by radio, information indicating the radio access scheme set in the step of setting the radio access scheme and the waveform shaping condition set in the step of setting the waveform shaping condition;

a step in which the user apparatus sets the radio access scheme according to the radio access scheme reported from the base station apparatus;

a conversion step in which the user apparatus performs discrete Fourier transform on a modulated symbol sequence or performs serial parallel conversion on the modulated symbol sequence according to the radio access scheme set by the step of setting the radio access scheme;

a step in which the user apparatus assigns radio resources to the modulated symbol sequence on which discrete Fourier transform has been performed in the conversion step or to the demodulated symbol sequence on which serial parallel conversion has been performed so as to generate a signal in the frequency domain;

a step in which the user apparatus performs waveform shaping on the signal in the frequency domain generated by the step of generating the signal of the frequency domain according to the information indicating the waveform shaping condition reported by the base station apparatus;

a step in which the user apparatus performs inverse fast Fourier transform on the signal in the frequency domain on which waveform shaping has been performed by the step of waveform shaping so as to generate a transmission signal; and a step in which the user apparatus transmits the transmission signal generated by the step of generating the transmission signal by radio.

Effect of the Invention

According to the disclosed user apparatus, the base station apparatus, and the communication control method, the coverage area and the data rate can be controlled according to environments.

DESCRIPTION OF REFERENCE SIGNS 50 cell
$100_1, 100_2, 100_3, \ldots, 100_n$ user apparatus
102 transmission data generation unit
104 channel coding unit
106 data modulation unit
108 radio access scheme switch unit
110 serial parallel conversion unit
112 DFT-Spread OFDM processing unit
114 discrete Fourier transform unit (DFT)
116 subcarrier mapping unit
118 waveform shaping filter 120 inverse fast Fourier transform unit
122 CP adding unit
124 multiplexing unit
126 demodulation unit
128 decoding unit
200 base station apparatus
202 scheduler
204 uplink radio access scheme/resource block assignment information signal generation unit
206 OFDM signal generation unit
208 synchronization detection/channel estimation unit
210 CP removing unit
212 fast Fourier transform unit
214 subcarrier demapping unit
216 radio access scheme switch unit
218 frequency domain equalization unit
220 inverse discrete Fourier transform unit
222 channel equalization unit
224 parallel serial conversion unit
226 radio access scheme switch unit
228 data demodulation unit
230 data decoding unit
300 upper station
400 core network

PREFERRED EMBODIMENTS FOR CARRYING OUT THE INVENTION

In the following, embodiments of the present invention are described with reference to figures. In all of the figures for explaining embodiments, the same reference symbols are used for parts having the same function, and repeated descriptions are not given.

(First Embodiment)

Figure 3:
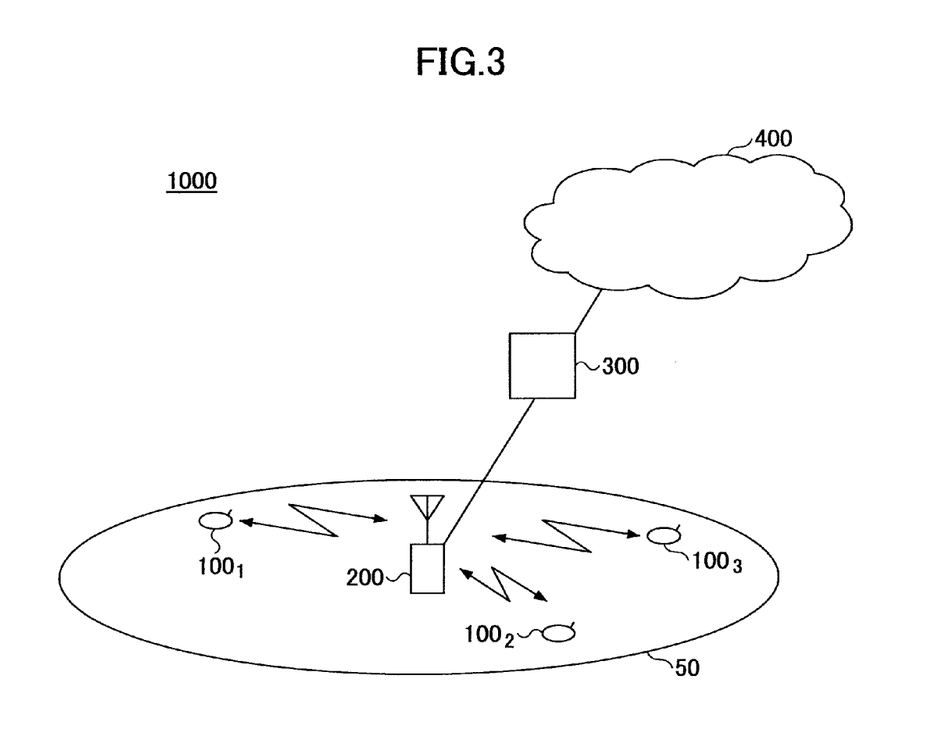
FIG. 3 is an explanatory diagram showing a radio communication system of an embodiment.

A mobile communication system including the user apparatus and the base station apparatus of an embodiment of the present invention is described with reference to FIG. 3.

The radio communication system 1000 is a system in which Evolved UTRA and UTRAN (Another name: Long Term Evolution, or Super 3G) is included, for example. The radio communication system may be called IMT-Advanced or 4G The radio communication system 1000 includes a base station apparatus (eNB: eNode B) 200 and a plurality of user apparatuses (UE: User Equipment) $100_n$ ($100_1$, $100_2$, $100_3$, ... $100_n$, n is an integer and n>0). Each of eNB and UE may be named differently according to discussion in the communication scheme of the next generation radio communication system. In such a case, each of them may be called using the different name. The base station apparatus 200 is connected to an upper station, and the upper station is connected to a core network 40. For example, the upper station may be configured to include an access gateway apparatus 300, for example. The access gateway apparatus 300 may be called Mobility Management Entity/Serving Gateway (MME/SGW). Also, the upper station may be changed according to discussion in the communication scheme of the next generation radio communication system. In such a case, the base station apparatus 200 is connected to such upper station.

In the following, since the user apparatuses ($100_1$, $100_2$, $100_3$, ... $100_n$) have the same configurations, functions and states, a user apparatus $100_n$ is described unless otherwise mentioned.

In the radio communication system 1000, that is, in the Evolved UTRAN, for example, OFDMA (orthogonal frequency division multiple access) is included in the downlink, and SC-FDMA (single-carrier-frequency division multiple access) is included in the uplink. As mentioned above, OFDMA is a multicarrier transmission scheme in which a frequency band is divided into a plurality of narrow frequency bands (subcarriers) so that transmission is performed by mapping data on each subcarrier. SC-FDMA is a single-carrier transmission scheme that can decrease interference among user apparatuses by dividing a frequency band for each user apparatus and by using different frequency bands with each other by a plurality of user apparatuses. Accordingly, full-support of E-UTRA can be realized in the present radio communication system.

In the following, communication channels in the Evolved UTRA and UTRAN are described. These communication channels may be applied to the radio communication system of the present embodiment.

In the downlink, the physical downlink shared channel (PDSCH) shared by each user apparatus $100_n$ and the physical downlink control channel (PDCCH) are used. The physical downlink control channel is also called a downlink L1/L2 control channel. User data, that is, a normal data signal is transmitted by the physical downlink shared channel.

In the uplink, the physical uplink shared channel (PUSCH) shared by each user apparatus $100_n$ and the physical uplink control channel are used. The physical uplink shared channel transmits user data, that is, the normal data signal. In addition, the physical uplink control channel transmits downlink quality information (CQI: Channel Quality Indicator) used for scheduling processing for the physical downlink shared channel and for the adaptive modulation and coding scheme (AMCS), and transmits acknowledgment information of the physical downlink shared channel. The contents of the acknowledgment information are represented as either one of Acknowledgement (ACK) indicating that a transmission signal has been properly received or Negative Acknowledgement (NACK) indicating that the signal has not been properly received.

In addition to the CQI and the acknowledgement information, the physical uplink control channel may transmit a scheduling request requesting resource assignment of the uplink shared channel, resource request in persistent scheduling, and the like. The resource assignment of the uplink shared channel means that the base station apparatus 200 reports, using the physical downlink control channel of a subframe, information to the user apparatus $100_n$ indicating that the user apparatus $100_n$ is permitted to perform communication using the uplink shared channel in a following subframe.

In the radio communication system of the present embodiment, a plurality of radio access schemes are applied to the user apparatus $100_n$. For example, the radio access schemes include a single-carrier scheme and a multicarrier scheme. In this case, the user apparatus $100_n$ can perform data transmission by the single-carrier scheme or the multicarrier scheme.

Figure 4:
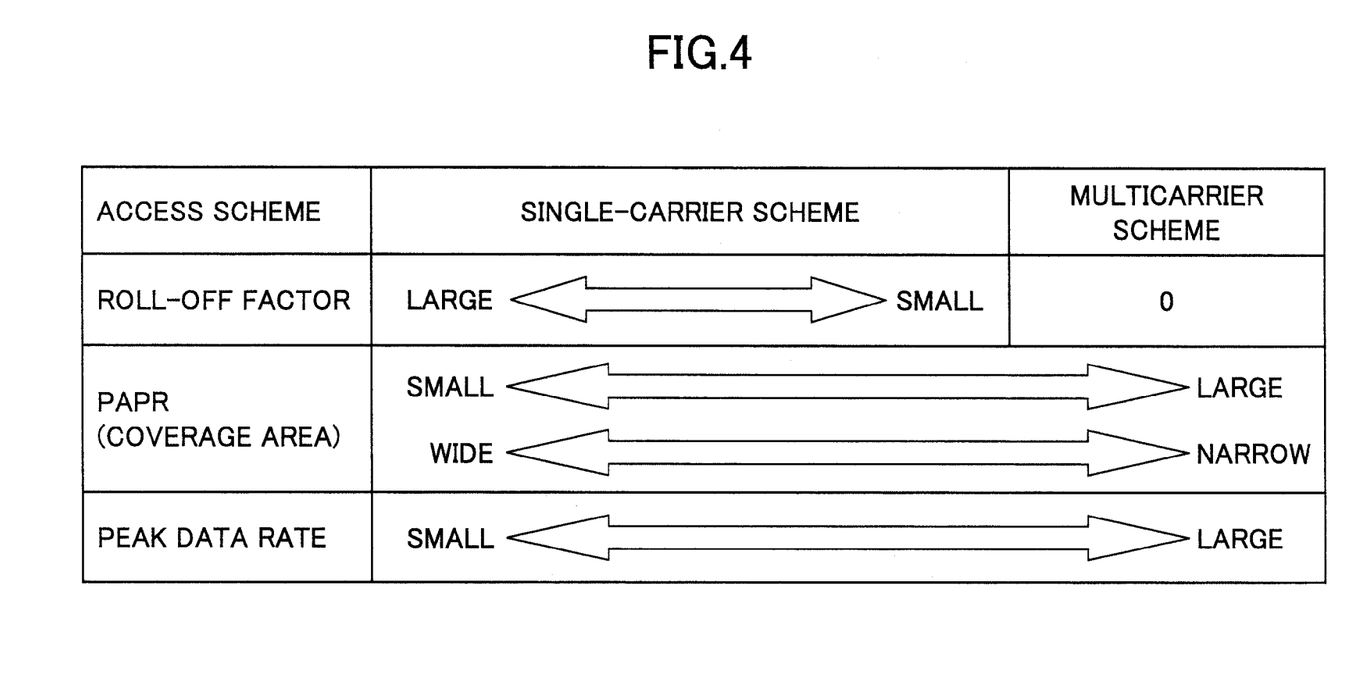
FIG. 4 is an explanatory diagram showing an example of adaptive control in access schemes.

As shown in FIG. 4, the single-carrier scheme has the property of low PAPR compared to the multicarrier scheme. Since the single-carrier scheme has the property of low PAPR, the single-carrier scheme is suitable for wide coverage area environment. On the other hand, since the multicarrier scheme has advantages in applying to MIMO, the multicarrier scheme is suitable for applying to an environment in which a high data rate is required. In addition, the multicarrier scheme excels in tolerance to the multipath interference.

In addition, the user apparatus $100_n$ controls a roll-off factor. The roll-off factor is a value showing characteristics of a waveform shaping filter, and means a degree of waveform shaping. The larger the roll-off factor is, the more PAPR can be decreased. However, the number of subcarriers that can be used for data transmission is decreased by waveform shaping. Therefore, frequency use efficiency decreases, so that the peak data rate (maximum transmission speed) decreases. Therefore, there is a trade-off between decrease of PAPR and increase of frequency use efficiency. In the present embodiment, the roll-off factor is used for controlling PAPR and frequency use efficiency. By using the roll-off factor, the coverage area and the data rate can be controlled.

In the user apparatus $100_n$ of the present embodiment, the radio access scheme and the roll-off factor are adaptively controlled according to the environment supported by the base station apparatus 200 that covers the area in which the user apparatus $100_n$ resides. By adaptively controlling the radio access scheme and the roll-off factor according to the environment supported by the base station apparatus 200, the coverage area and the peak data rate can be controlled optimally. For example, as mentioned later, the roll-off factor may be controlled based on assigned bandwidth, in other words, the number of resource blocks, channel coding rate and modulation scheme.

Figure 5:
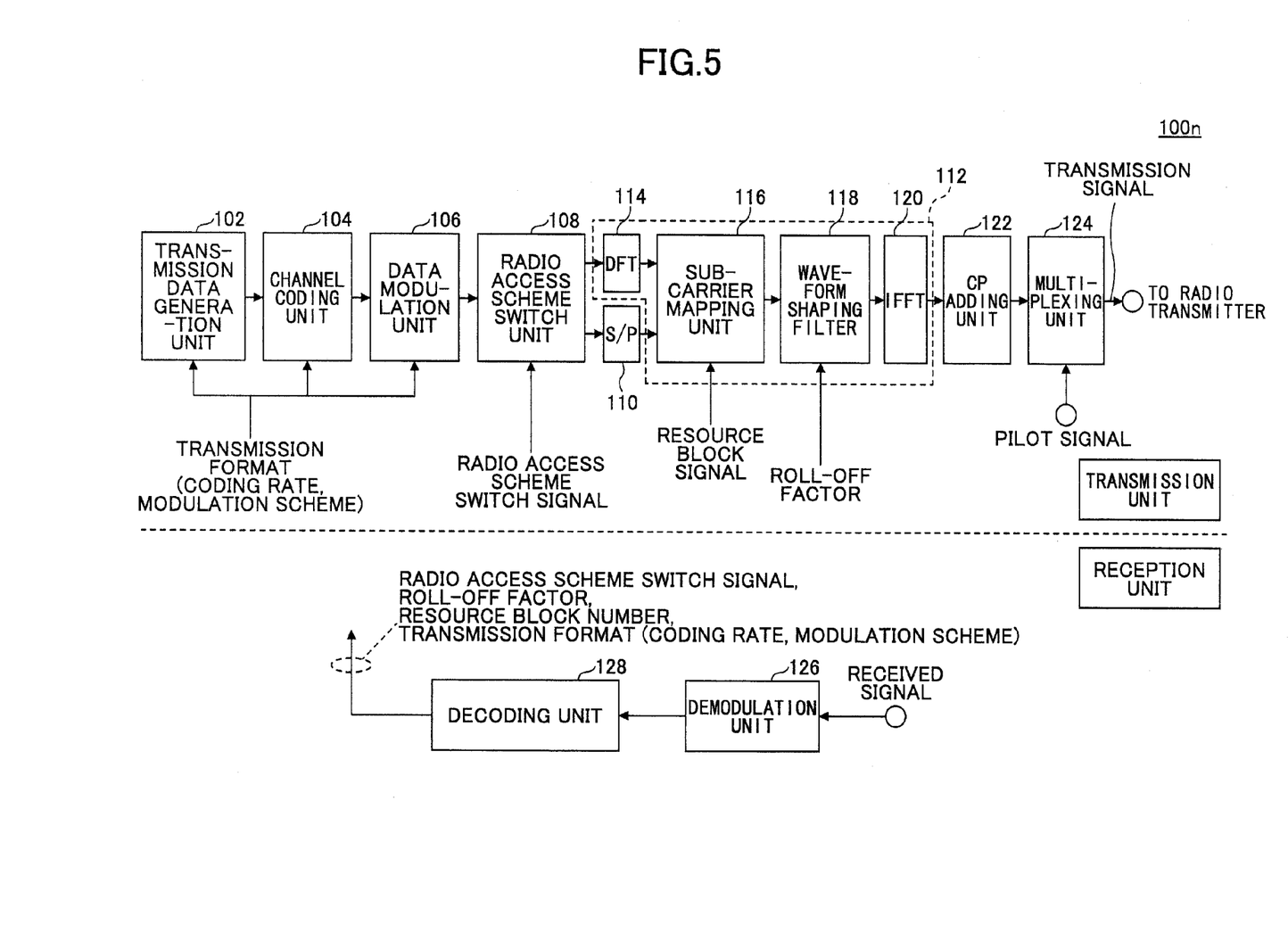
FIG. 5 is a partial block diagram showing a user apparatus of an embodiment.

Next, the user apparatus $100_n$ of the present embodiment is described with reference to FIG. 5.

The user apparatus $100_n$ of the present embodiment includes a transmission data generation unit 102, a channel coding unit 104, a data modulation unit 106, a radio access scheme switch unit 108, a serial parallel conversion unit (S/P) 110, a DFT-Spread OFDM processing unit 112, a CP (cyclic Prefix) adding unit 122, a multiplexing unit 124, a demodulation unit 126, and a decoding unit 128. The DFT-Spread OFDM processing unit 112 includes a discrete Fourier transform unit (DFT) unit 114, a subcarrier mapping unit 116, a waveform shaping filter 118 and an inverse fast Fourier transform unit (IFFT) 120.

The downlink signal transmitted by the base station apparatus 200 is input to the demodulation unit 126. The demodulation unit 126 demodulates the input OFDMA signal. Then, the demodulation unit 126 inputs the demodulated OFDMA signal to the decoding unit 128.

The decoding unit 128 is connected to the demodulation unit 126, and decodes the OFDMA signal input from the demodulation unit 126. The OFDMA signal may be a signal transmitted by a broadcast channel, or may be a signal transmitted by a downlink control channel. The OFDMA signal may include a radio access scheme switch signal, a roll-off factor, a resource block number and a transmission format. The transmission format may include a coding rate and a modulation scheme. The decoding unit 128 inputs the transmission format to the transmission data generation unit 102, the channel coding unit 104 and the data modulation unit 106. In addition, the decoding unit 128 inputs the radio access scheme switch signal to the radio access scheme switch unit 108. The decoding unit 128 inputs the resource block number to the subcarrier mapping unit 116. The decoding unit 128 inputs the roll-off factor to the waveform shaping filter 118.

The transmission data generation unit 102 generates data to be transmitted in the uplink. The transmission data generation unit 102 inputs the generated data to be transmitted in the uplink to the channel coding unit 104.

The channel coding unit 104 is connected to the transmission data generation unit 102, and performs channel coding processing on the transmission data input from the transmission data generation unit 102 based on the transmission format input from the decoding unit 128. The channel coding unit 104 inputs the transmission data on which channel coding processing has been performed to the data modulation unit 106. For example, the channel coding unit 104 performs channel coding processing using the coding rate included in the transmission format.

The data modulation unit 106 is connected to the channel coding unit 104, and modulates, based on the transmission format input by the decoding unit 128, the transmission data on which channel coding processing has been performed input by the channel coding unit 104. The data modulation unit 106 inputs, to the radio access scheme switch unit 108, the modulated transmission data on which channel coding processing has been performed. For example, the data modulation unit 106 performs data modulation using the modulation scheme included in the transmission format.

The radio access scheme switch unit 108 is connected to the data modulation unit 106, and switches, based on the radio access scheme switch signal input by the decoding unit 128, the modulated transmission data on which channel coding processing has been performed input from the data modulation unit 106 into the single-carrier mode for transmitting by the single-carrier scheme or into the multicarrier mode for transmitting by the multicarrier mode. When the radio access scheme switch signal includes information indicating the single-carrier scheme, the radio access scheme switch unit 108 sets the transmission data into the single-carrier scheme. When the radio access scheme switch signal includes information indicating the multicarrier scheme, the radio access scheme switch unit 108 sets the transmission data into the multicarrier scheme. When the radio access scheme switch signal includes the information indicating the single-carrier scheme, the radio access scheme switch unit 108 inputs the input modulated transmission data to the discrete Fourier transform unit 114. In addition, when the radio access scheme switch signal includes the information indicating the multi-carrier scheme, the radio access scheme switch unit 108 inputs the input modulated transmission data to the serial parallel conversion unit (S/P) 110.

The discrete Fourier transform unit 114 is connected to the radio access scheme switch unit 108, and divides the sequence of the transmission data input by the radio access scheme switch unit 108 into blocks every Q symbols, and performs fast Fourier transform so as to convert the sequence to the frequency domain. Then, the discrete Fourier transform unit 114 inputs the signal of Q single-carriers obtained in the frequency domain into the subcarrier mapping unit 116.

The serial parallel conversion unit (S/P) 110 is connected to the radio access scheme switch unit 108, and converts the sequence of the transmission data input by the radio access scheme switch unit 108 into a plurality of parallel signal sequences. Then, the serial parallel conversion unit 110 inputs the parallel signal sequences into the subcarrier mapping unit 116.

The subcarrier mapping unit 116 is connected to the discrete Fourier transform unit 114 and the serial parallel conversion unit 110. The subcarrier mapping unit 116 generates a signal of the frequency domain by assigning, to each subcarrier based on a resource block number input by the decoding unit 128, a single-carrier signal input by the discrete Fourier transform unit 114 or each signal of converted parallel signal sequences input by the serial parallel conversion unit 110. For example, the subcarrier mapping unit 116 assigns the single-carrier signal to subcarriers corresponding to the resource block number. In addition, for example, the subcarrier mapping unit 116 assigns each of the signals converted to a plurality of parallel signal sequences to subcarriers corresponding to the resource block number. For example, the assigned subcarriers may be discontinuous subcarriers or may be continuous subcarriers. The subcarrier mapping unit 116 inputs the signal mapped to the subcarriers to the waveform shaping filter 118.

The waveform shaping filter 118 is connected to the subcarrier mapping unit 116, and performs waveform shaping on signals input by the discrete Fourier transform unit 114 or the serial parallel conversion unit 110 based on the roll-off factor input by the decoding unit 128. Then, the waveform shaping filter 118 inputs the waveform shaped signal to the IFFT 120.

The IFFT 120 is connected to the waveform shaping filter 110, and performs inverse fast Fourier transform on the signal input by the waveform shaping filter 118 so as to perform modulation of the OFDM scheme. The signal on which modulation of the OFDM scheme has been performed is input to the CP adding unit 122.

The CP adding unit 122 is connected to the IFFT 120. The CP adding unit 122 adds a cyclic prefix to the signal, input by the IFFT 120, on which modulation of the OFDM scheme has been performed so as to generate a symbol (OFDM symbol) in the OFDM scheme. The CP adding unit 122 inputs the generated symbol of the OFDM scheme to the multiplexing unit 124.

The multiplexing unit 124 is connected to the CP adding unit 122, and multiplexes the OFDM symbol input by the CP adding unit 122 with the pilot signal. The multiplexed signal is input to the radio transmitter. The radio transmitter transmits a signal in which the OFDM symbol is multiplexed with the pilot signal.

Figure 6:
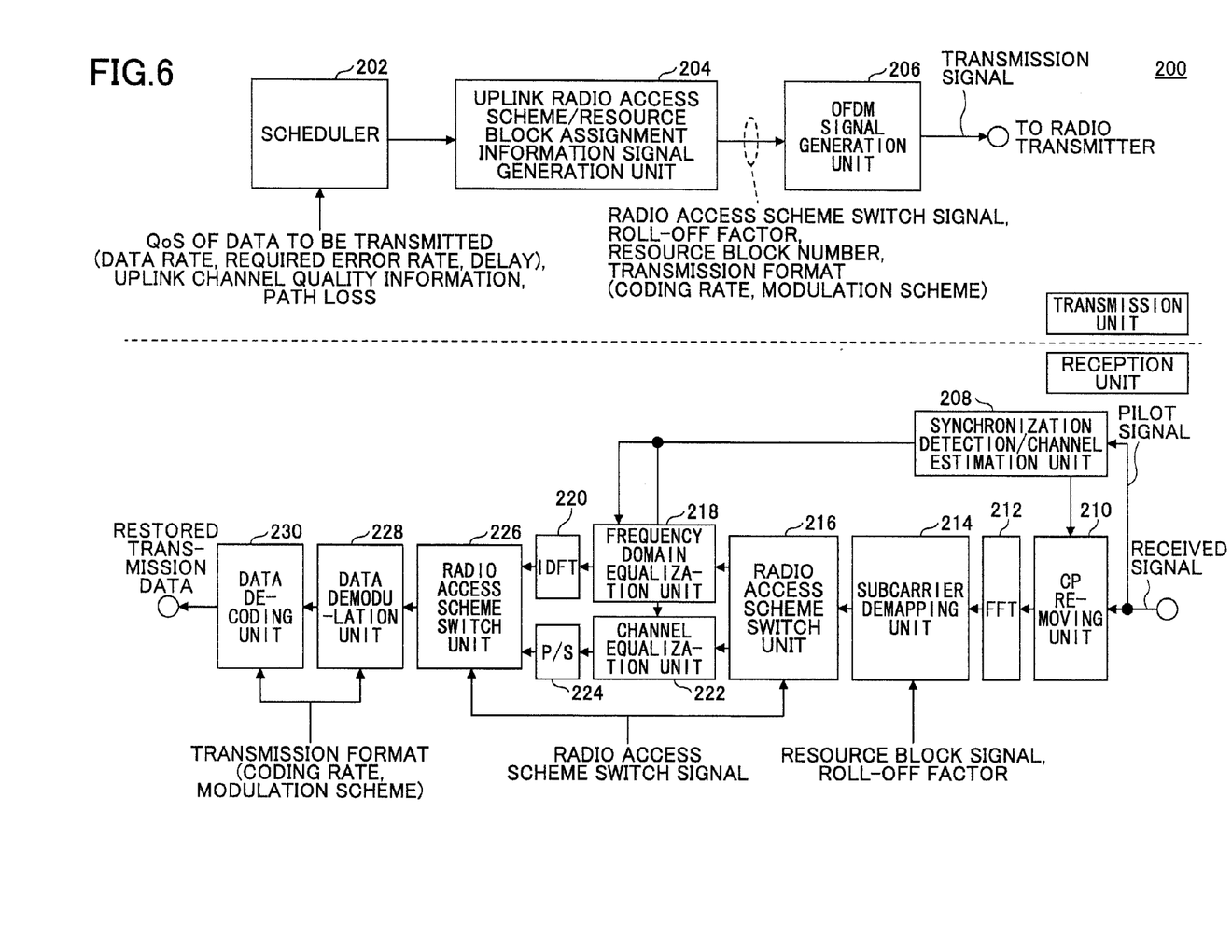
FIG. 6 is a partial block diagram showing a base station apparatus of an embodiment.

Next, the base station apparatus 200 of the present embodiment is described with reference to FIG. 6.

The base station apparatus 200 of the present embodiment includes a scheduler 202, an uplink radio access scheme/resource block assignment information signal generation unit 204, an OFDM signal generation unit 206, a synchronization detection/channel estimation unit 208, a CP removing unit 210, a fast Fourier transform unit 212, a subcarrier demapping unit 214, a radio access scheme switch unit 216, a frequency domain equalization unit 218, an inverse discrete Fourier transform (IDFT) unit 220, a channel equalization unit 222, a parallel serial conversion unit (P/S) 224, a radio access scheme switch unit 226, a data demodulation unit 228, and a data decoding unit 230.

When data to be transmitted in the uplink arises, the user apparatus $100_n$ transmits a signal for requesting assignment of radio resources for transmitting the data. The request signal may be a scheduling request. For example, the request signal may include QoS required for the data to be transmitted. For example, QoS may include a data rate. The QoS may include a required error rate. The QoS may include required information relating to delay. The QoS included in the signal for requesting radio resource assignment transmitted by the user apparatus $100_n$ is input to the scheduler 202.

The base station apparatus 200 measures uplink channel quality (reception quality) based on the pilot signal transmitted by the user apparatus $100_n$. The uplink channel quality information is input to the scheduler 202. In addition, the base station apparatus 200 measures path loss. The path loss is input to the scheduler 202.

The scheduler 202 determines a user apparatus to which the radio resources are assigned and determines a resource block assigned to the user apparatus based on the input QoS, uplink channel quality, and the path loss. The resource unit is represented by a time axis and a frequency axis. The resource unit is represented by a resource grid defined by $N_{RB}^{UL} N_{sc}^{RB}$ subcarriers and $N_{symb}^{UL}$ SC-FDMA symbols. $N_{RB}^{UL}$ indicates an uplink bandwidth represented by a plurality of $N_{sc}^{RB}$, and satisfies $6 \leq N_{RB}^{UL} \leq 110$. $N_{sc}^{RB}$ is a resource block size in the frequency domain represented as a plurality of subcarriers. $N_{symb}^{UL}$ is the number of SC-FDMA symbols included in the uplink slot. For example, resolution in the time domain is 1 ms, and resolution in the frequency domain is 180 kHz.

In addition, the scheduler 202 determines a radio access scheme used by the user apparatus to which the radio resources are assigned. For example, the scheduler 202 determines whether to cause the user apparatus, to which the radio resources are assigned, to transmit an uplink signal using the single-carrier scheme or the multicarrier scheme.

In addition, the scheduler 202 determines a roll-off factor applied to the user apparatus for a user to which the radio resources are assigned. The roll-off factor may be one value, or a plurality of values may be used. For example, the scheduler 202 may determine different roll-off factors based on the position of the residing user apparatus.

(Radio Access Scheme Determination Method (1))

For example, the scheduler 202 determines whether to cause the residing user apparatus $100_n$ to transmit uplink data using the single-carrier scheme or the multicarrier scheme based on distance between sites in the base station apparatus 200. In other words, the scheduler 202 determines a radio access scheme to be used by the residing user apparatus $100_n$ based on the distance between the base station apparatus 200 and another base station apparatus located near the base station apparatus 200. More particularly, when the distance between sites is less than a predetermined distance, it is determined to cause the user apparatus to transmit by the multicarrier scheme. By determining to cause the user apparatus to transmit by the multicarrier scheme when the distance between sites is less than a predetermined distance, peak data rate can be improved. When the distance between sites is equal to or greater than the predetermined distance, it is determined to cause the user apparatus to transmit by the single-carrier scheme. By determining to cause the user apparatus to transmit by the single-carrier scheme when the distance between sites is equal to or greater than the predetermined distance, coverage can be maintained. The predetermined distance may be determined by PAPR and data rate.

When the scheduler 202 determines to cause the user apparatus to transmit by the multicarrier scheme, the scheduler 202 may set the roll-off factor to be 0. By setting the roll-off factor to be 0 when it is determined to cause the user apparatus to transmit by the multicarrier scheme, high speed transmission can be realized. On the other hand, when it is determined to cause the user apparatus to transmit by the single-carrier scheme, the scheduler 202 may determine the roll-off factor according to the radius of the cell covered by the base station apparatus 200. For example, the larger the cell radius is, the larger the roll-off factor is set. By setting the roll-off factor to be larger as the cell radius becomes larger, PAPR can be reduced and coverage area can be widened. Since PAPR can be reduced and coverage area can be widened, reception quality of the uplink signal transmitted by a user apparatus located at a cell end can be improved.

(Radio Access Scheme Determination Method (2))

In addition, for example, the scheduler 202 may determine whether to cause the residing user apparatus $100_n$ to transmit uplink data using the single-carrier scheme or the multicarrier scheme based on configuration of the cell of the base station apparatus 200. More particularly, when the cell configuration is an indoor cell or a hot spot cell, it is determined to cause the user apparatus to transmit by the multicarrier scheme. This is because, since the cell radius is small, the peak data rate is prioritized over the coverage area. When the cell configuration is a macro cell or a micro cell, it is determined to cause the user apparatus to transmit by the single-carrier scheme. This is because, compared to the indoor cell or the hot spot cell, it is necessary to keep coverage area.

When the scheduler 202 determines to cause the user apparatus to transmit by the multicarrier scheme, the scheduler 202 may set the roll-off factor to be 0. By setting the roll-off factor to be 0 when it is determined to cause the user apparatus to transmit by the multicarrier scheme, high speed transmission can be realized. On the other hand, when it is determined to cause the user apparatus to transmit by the single-carrier scheme, the scheduler 202 may determine the roll-off factor according to the radius of the cell covered by the base station apparatus 200. For example, the larger the cell radius is, the larger the roll-off factor is set. By doing so, PAPR can be reduced and coverage area can be widened. Since PAPR can be reduced and coverage area can be widened, reception quality of the uplink signal transmitted by a user apparatus located at a cell end can be improved.

(Radio Access Scheme Determination Method (3))

In addition, for example, the scheduler 202 may determine whether to cause the residing user apparatus $100_n$ to transmit uplink data using the single-carrier scheme or the multicarrier scheme based on types of the physical channel. More particularly, for a data channel, it is determined to cause the user apparatus to transmit by the multicarrier scheme. By transmitting the data channel using the multicarrier scheme, high speed transmission can be realized. Also, as for a control channel, the scheduler 202 determines to cause the user apparatus to transmit using the single-carrier scheme. By causing the user apparatus to transmit the control channel using the single-carrier scheme, the base station apparatus 200 can decrease reception error of the control channel transmitted by the user apparatus $100_n$.

When the scheduler 202 determines to cause the user apparatus to transmit by the multicarrier scheme, the scheduler 202 may set the roll-off factor to be 0. By doing so, high speed transmission can be realized. On the other hand, when it is determined to cause the user apparatus to transmit by the single-carrier scheme, the scheduler 202 may determine the roll-off factor according to the radius of the cell covered by the base station apparatus 200. For example, the larger the cell radius is, the larger the roll-off factor is set. By doing so, PAPR can be reduced and coverage area can be widened. Therefore, reception quality of the uplink signal transmitted by a user apparatus located at a cell end can be improved.

The scheduler 202 sets the apparatus into the determined radio access scheme, and inputs, to the uplink radio access scheme/resource block assignment information signal generation unit 204, the radio access scheme, the roll-off factor, resource blocks to be assigned to the user and the MCS set. In addition, the scheduler 202 inputs, to the subcarrier demapping unit 214, information indicating resource blocks assigned to the user. For example, the information indicating the resource blocks may include resource block numbers. In addition, a radio access scheme switch signal including the set radio access scheme is input to the radio access scheme switch units 216 and 226. In addition, the scheduler 202 inputs the roll-off factor in the subcarrier demapping unit 214. In addition, the scheduler 202 inputs the MCS set to the data demodulation unit 228 and the data decoding unit 230.

The uplink radio access scheme/resource block assignment information signal generation unit 204 is connected to the scheduler 202. The uplink radio access scheme/resource block assignment information signal generation unit 204 generates, based on information input by the scheduler 202, information signal including radio access scheme switch signal, roll-off factor, resource block number and transmission format. Then, the uplink radio access scheme/resource block assignment information signal generation unit 204 inputs the generated information signal to the OFDM signal generation unit 206.

The OFDM signal generation unit 206 is connected to the uplink radio access scheme/resource block assignment information signal generation unit 204. The OFDM signal generation unit 206 generates an OFDM signal from the information signal input from the uplink radio access scheme/resource block assignment information signal generation unit 204, and inputs the OFDM signal to the radio transmitter. The radio transmitter transmits the OFDM signal. For example, control information may be broadcasted to all users in the cell using a broadcast channel.

The uplink signal transmitted by the user apparatus $100_n$ is received by the base station apparatus 200. The base station apparatus 200 inputs a pilot signal included in the uplink signal to the synchronization detection/channel estimation unit 208.

The synchronization detection/channel estimation unit 208 performs synchronization detection of the input pilot signal to estimate reception timing, and inputs the estimated reception timing to the CP removing unit 210. In addition, the synchronization detection/channel estimation unit 208 performs channel estimation based on the input pilot signal and inputs the result of channel estimation to the frequency domain equalization unit 218 and to the channel equalization unit 222.

The CP removing unit 210 is connected to the synchronization detection/channel estimation unit 208, and removes CP from the received signal based on reception timing input from the synchronization detection/channel estimation unit 208. Then, the CP removing unit 210 inputs the received signal from which CP has been removed to the FFT 212.

The FFT 212 is connected to the CP removing unit 210. The FFT 212 performs Fourier transform on the received signal, input by the CP removing unit 210, from which CP has been removed so as to convert the time-series information to information of the frequency domain. The FFT 212 inputs the information of the frequency domain to the subcarrier demapping unit 214.

The subcarrier demapping unit 214 performs demapping in the frequency domain based on the resource block number input by the scheduler 202. Demapping processing is performed corresponding to mapping in the frequency domain performed in each user apparatus. In addition, the subcarrier demapping unit 214 performs demapping based on the roll-off factor input by the scheduler 202. The subcarrier demapping unit 214 inputs, to the radio access scheme switch unit 216, the signal of the frequency domain for which demapping processing has been performed.

Based on the radio access scheme switch signal input by the scheduler 202, when the radio access scheme switch signal is a signal indicating the single-carrier scheme, the radio access scheme switch unit 216 inputs, to the frequency domain equalization unit 218, the frequency domain signal input from the subcarrier demapping 214 for which demapping professing has been performed. In addition, based on the radio access scheme switch signal input by the scheduler 202, when the radio access scheme switch signal is a signal indicating the multicarrier scheme, the radio access scheme switch unit 216 inputs, to the channel equalization unit 222, the frequency domain signal input from the subcarrier demapping unit 214 for which demapping professing has been performed.

The frequency domain equalization unit 218 performs frequency domain equalization processing on the frequency domain signal for which demapping processing has been performed, based on the channel estimation value input by the synchronization detection/channel estimation unit 208. Then, the frequency domain equalization unit 218 inputs the signal on which equalization processing has been performed to the IDFT 220.

The IDFT 220 is connected to the frequency domain equalization unit 218, and performs inverse discrete Fourier transform on the signal on which equalization processing has been performed by the frequency domain equalization unit 218. Then, the IDFT 220 inputs, to the radio access scheme switch unit 226, the signal on which inverse discrete Fourier transform has been performed.

Based on the channel estimation value input by the synchronization detection/channel estimation unit 208, the channel equalization unit 222 performs channel equalization processing on the frequency domain signal on which demapping processing has been performed. Then, the channel equalization unit 222 inputs the signal on which channel equalization processing has been performed to the P/S 224.

The P/S 224 is connected to the channel equalization unit 222, and performs parallel to serial conversion processing on the signal for which channel equalization processing has been performed by the channel equalization unit 222. Then, the P/S 224 inputs the signal on which parallel serial conversion has been performed to the radio access scheme switch unit 226.

The radio access scheme switch unit 226 is connected to the IDFT 220 and the P/S 224. The radio access scheme switch unit 226 inputs, to the data demodulation unit 228, the signal input from the IDFT 220 on which inverse discrete Fourier transform has been performed or the signal input by the P/S 224 on which parallel serial conversion has been performed.

The data demodulation unit 228 is connected to the radio access scheme switch unit 226. Based on the transmission format input by the scheduler 202, the data demodulation unit 228 performs demodulation on the signal, input by the radio access scheme switch unit 226, for which inverse discrete Fourier transform has been performed or for which parallel serial conversion has been performed. Then, the data demodulation unit 228 inputs the demodulated signal to the data decoding unit 230.

The data decoding unit 230 is connected to the data demodulation unit 228, and decodes the demodulated signal input by the demodulation unit 228 based on the transmission format input by the scheduler 202. As a result, transmission data is obtained.

Figure 7:
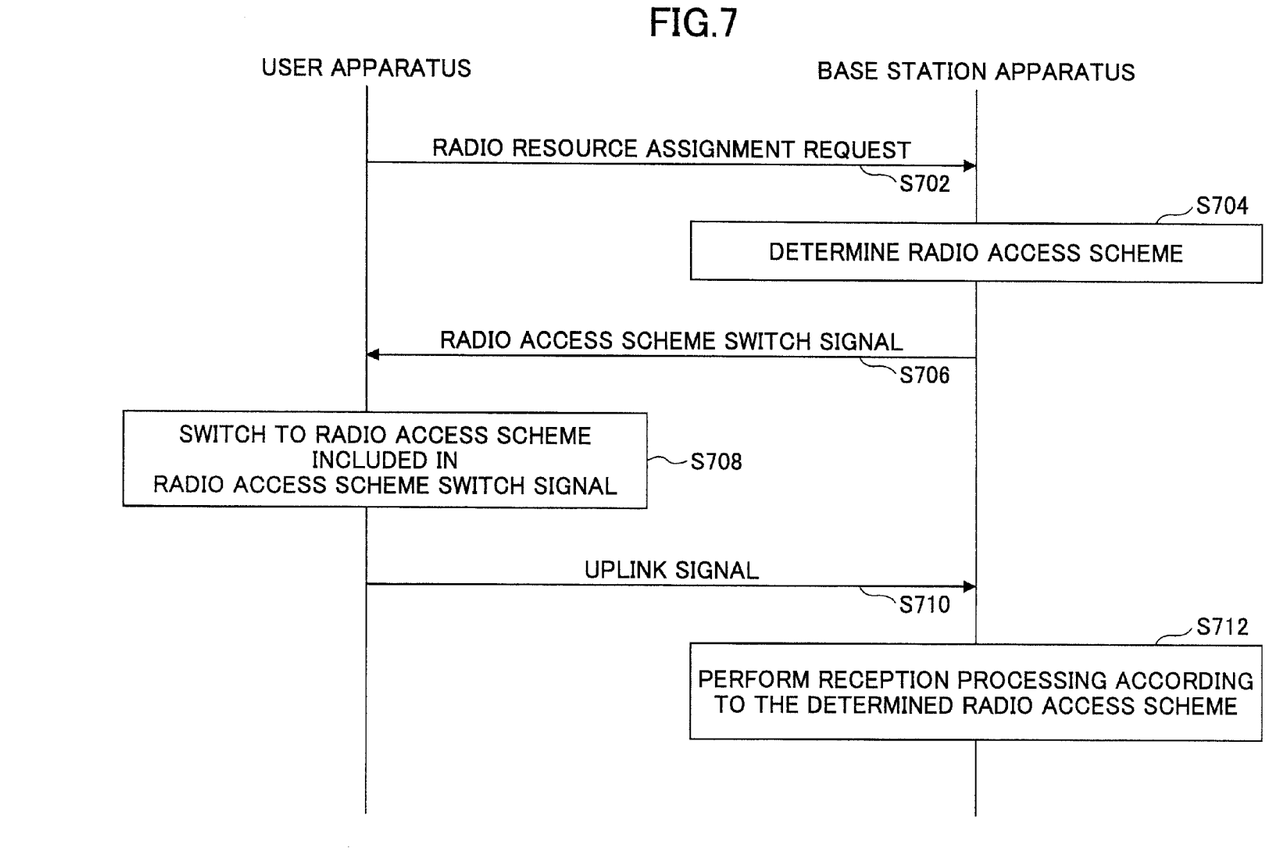
FIG. 7 is a flow diagram showing a communication control method of an embodiment.

The communication control method of the present embodiment is described with reference to FIG. 7.

The user apparatus $100_n$ transmits a request for radio resource assignment to the base station apparatus 200 (step S702). For example, when an uplink signal arises, the user apparatus $100_n$ transmits a request for radio resource assignment to the base station apparatus 200 in order to transmit the uplink signal.

The base station apparatus 200 performs scheduling based on the request for radio resource assignment transmitted from the user apparatus $100_n$. Then, when determining to assign radio resources to the user apparatus $100_n$, the base station apparatus 200 determines resource blocks and a transmission format to be assigned to the user apparatus $100_n$.

In addition, the base station apparatus 200 determines a radio access scheme to be applied to the user apparatus $100_n$ (step S704). For example, the scheduler 202 performs scheduling based on QoS required for uplink data transmitted by the user apparatus $100_n$, quality information of the uplink channel, path loss and the like. Then, the scheduler 202 determines the radio access scheme to be applied to the user apparatus $100_n$ using any of the above-mentioned radio access scheme determination methods. In addition, the scheduler 202 determines a roll-off factor using any of the above-mentioned radio access scheme determination methods.

The base station apparatus 200 transmits a radio access scheme switch signal (step S706). For example, the base station apparatus 200 may transmit the radio access scheme switch signal using a broadcast channel. The radio access scheme switch signal includes information of a radio access scheme to be applied to the user apparatus $100_n$.

Based on the radio access scheme switch signal transmitted from the base station apparatus 200, the user apparatus $100_n$ switches to a radio access scheme included in the radio access scheme switch signal (step S708). For example, the radio access switch unit 108 switches a scheme to the radio access scheme included in the radio access scheme switch signal.

The user apparatus $100_n$ transmits an uplink signal according to the radio access scheme included in the radio access scheme switch signal (step S710).

The base station apparatus 200 performs reception processing for the uplink signal transmitted by the user apparatus $100_n$ according to the radio access scheme determined in step S704 (step S712).

In the above-mentioned embodiment, in the case when it is determined to cause the user apparatus $100_n$ to transmit the uplink signal using the multicarrier scheme, the roll-off factor may be defined to be 0 on the system. By defining that the roll-off factor is 0 on the system when it is determined to cause the user apparatus $100_n$ to transmit the uplink signal using the multicarrier scheme, it is not necessary for the base station apparatus to report the roll-off factor when the base station apparatus determines to cause the user apparatus $100_n$ to transmit the uplink signal using the multicarrier scheme. Since it is not necessary to report the roll-off factor, the information amount to be transmitted can be reduced.

According to the present embodiment, the radio access scheme can be switched in the uplink according to an environment to be supported. For example, the environment to be supported includes a cell configuration. In addition, even when the multicarrier scheme is applied, a transmitter of a single-carrier scheme can realize it by adding S/P.

In addition, the radio access scheme and the roll-off factor of the waveform shaping filter can be adaptively controlled according to the environment to be supported. Therefore, PAPR and the peak data rate can be optimized.

(Second Embodiment)

The radio communication system including the user apparatus and the base station apparatus of the present embodiment is similar to the user apparatus and the base station apparatus described with reference to FIGS. 3-6.

In the radio communication system of the present embodiment, the base station apparatus 200 determines a radio access scheme individually for each residing user apparatus.

The scheduler 202 performs control specific to each user apparatus according to information such as QoS and channel quality. The QoS may include a data rate of data to be transmitted, a required error rate, and required information relating to delay. The channel quality may include Channel Quality Indicator (CQI) and path loss.

In addition, for example, the scheduler 202 may determine whether to cause the user apparatus $100_n$ to transmit uplink data using the single-carrier scheme or the multicarrier scheme based on the number of resource blocks (RB) to be assigned. More particularly, when the number of resource blocks to be assigned to the user apparatus $100_n$ is equal to or greater than a predetermined number, it is determined to cause the user apparatus to transmit by the multicarrier scheme. This is because the peak data rate is prioritized. When the number of resource blocks to be assigned to the user apparatus $100_n$ is less than the predetermined number, it is determined to cause the user apparatus to transmit by the single-carrier scheme.

When the scheduler 202 determines to cause the user apparatus to transmit by the multicarrier scheme, the scheduler 202 may set the roll-off factor to be 0. By setting the roll-off factor to be 0 when it is determined to cause the user apparatus to transmit by the multicarrier scheme, high speed transmission can be realized in the multicarrier scheme. On the other hand, when it is determined to cause the user apparatus to transmit by the single-carrier scheme, the scheduler 202 may determine the roll-off factor according to the number of resource blocks to be assigned to the user apparatus $100_n$. For example, the larger the number of resource blocks to be assigned to the user apparatus $100_n$ is, the larger the roll-off factor is set. By increasing the roll-off factor as the number of resource blocks becomes large, PAPR can be reduced and coverage area can be widened. Since PAPR can be reduced and coverage area can be widened, reception quality of the uplink signal transmitted by a user apparatus located at a cell end can be improved.

In addition, the scheduler 202 determines a modulation and channel coding scheme (MCS) set to be applied to the use apparatus to which radio resources are assigned. When determining the MCS set to be applied to the use apparatus to which radio resources are assigned, the MCS set may be associated with the roll-off factor. For example, if the determined MCS set is a high efficiency MCS that is a modulation and channel coding scheme having high transmission efficiency, the roll-off factor is set to be a small value. If the determined MCS set is a low efficiency MCS that is a modulation and channel coding scheme having low transmission efficiency, the roll-off factor is set to be a large value. Regarding the number of resource blocks and the MCS, it is assumed that, the larger the number of RBs is, and the higher the transmission efficiency of MCS is, the nearer to the base station apparatus 200 the user apparatus $100_n$ resides. Since it is assumed that the user apparatus $100_n$ resides near the base station apparatus 200, the peak data rate is prioritized over the coverage area. On the other hand, regarding the number of resource blocks and the MCS, it is assumed that, the smaller the number of RBs is, and the lower the transmission efficiency of MCS is, the nearer to the cell end the user apparatus $100_n$ is located. Since it is assumed that the user apparatus $100_n$ is located near the cell end, the coverage area is prioritized over the peak data rate.

In addition, for example, the scheduler 202 may determine whether to cause the user apparatus $100_n$ to transmit uplink data using the single-carrier scheme or the multicarrier scheme according to the data rate of the transmission data. More particularly, the scheduler 202 determines, based on path loss, to apply the multicarrier scheme that can realize a high data rate for a user located near the base station apparatus. In addition, the scheduler 202 may determine, based on information of available transmission power and the like, to apply the multicarrier scheme that can realize a high data rate for a user located near the base station apparatus. Also, the scheduler determines to apply the single-carrier scheme for a user of the cell end. In addition, for the user to which the single-carrier scheme is applied, increase of coverage area may be realized by performing control to increase the roll-off factor.

In the present embodiment, the radio access scheme switch signal may be reported to each user using the physical downlink control channel. For example, the physical downlink control channel may include a L1/L2 control channel.

The second embodiment may be combined with the first embodiment. For example, the radio access scheme/roll-off factor is determined based on control information specific to the cell. For example, the base station apparatus 200 reports the information specific to the cell to the residing user apparatus $100_n$ using the broadcast channel. After reporting the information specific to the cell to the residing user apparatus $100_n$, the radio access scheme/roll-off factor may be controlled according to individual control information for each user apparatus. For example, the base station apparatus 200 reports the information specific to each user apparatus to the corresponding user apparatus $100_n$ using the physical downlink control channel.

For example, although, from the viewpoint of coverage area, it can be considered to apply the single-carrier scheme for an environment in which the distance between sites is large and for the macro cell, control may be performed to apply the multicarrier scheme for the user apparatus near the base station apparatus 200 in order to realize high speed data transmission. Especially, it is preferable when there is a request for high speed data transmission from the user apparatus near the base station apparatus 200.

On the other hand, for example, for a user located at the cell end, control may be performed to apply large roll-off factor by the single-carrier scheme according to the channel quality.

The communication control method of the present embodiment is different from the communication control method described with reference to FIG. 7 in that the radio access scheme switch signal is reported to each user using the dedicated L1/L2 control channel in step S706.

In the above-mentioned embodiment, in the case when it is determined to cause the user apparatus to transmit the uplink signal using the multicarrier scheme, the roll-off factor may be defined to be 0 on the system. By defining that the roll-off factor is 0 on the system when it is determined to cause the user apparatus to transmit the uplink signal using the multicarrier scheme, it is not necessary for the base station apparatus to report the roll-off factor when the base station apparatus determines to cause the user apparatus to transmit the uplink signal using the multicarrier scheme. Since it is not necessary to report the roll-off factor, the information amount to be transmitted can be reduced.

According to the present embodiment, the radio access scheme can be switched for each user apparatus according to the environment to be supported in the uplink. For example, the environment to be supported includes a cell configuration. In addition, even when the multicarrier scheme is applied, a transmitter of the single-carrier scheme can realize it by adding S/P.

In addition, the radio access scheme and the roll-off factor of the waveform shaping filter can be adaptively controlled according to the environment to be supported. Therefore, PAPR and the peak data rate can be optimized.

For the sake of convenience of explanation, the present invention is described by classifying to some embodiments. But, classification into each embodiment is not essential in the present invention, and equal to or more than two embodiments may be used as necessary. While specific numerical value examples are used to facilitate understanding of the present invention, such numerical values are merely examples, so that any appropriate value may be used unless specified otherwise.

As described above, while the present invention is described with reference to specific embodiments, the respective embodiments are merely exemplary, so that a skilled person will understand variations, modifications, alternatives, and replacements. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2008-088105, filed in the JPO on Mar. 28, 2008 and the entire contents of the Japanese patent application No. 2008-088105 are incorporated herein by reference.

The invention claimed is:

1. A user apparatus to which radio access schemes of a single-carrier scheme and a multicarrier scheme are applied, comprising:
 a radio access scheme setting unit configured to set a radio access scheme;
 a discrete Fourier transform unit configured to perform discrete Fourier transform on a modulated symbol sequence when the radio access scheme set by the radio access scheme setting unit is the single-carrier scheme;
 a serial parallel conversion unit configured to perform serial parallel conversion on the modulated symbol sequence when the radio access scheme set by the radio access scheme setting unit is the multicarrier scheme;
 a frequency domain signal generation unit configured to assign radio resources to the modulated symbol sequence on which discrete Fourier transform has been performed by the discrete Fourier transform unit or to the demodulated symbol sequence on which serial parallel conversion has been performed by the serial parallel conversion unit so as to generate a signal in the frequency domain;
 a waveform shaping filter configured to perform waveform shaping on the signal in the frequency domain generated by the frequency domain signal generation unit;
 a transmission signal generation unit configured to perform inverse fast Fourier transform on the signal in the frequency domain on which waveform shaping has been performed by the waveform shaping filter so as to generate a transmission signal; and
 a transmission unit configured to transmit the transmission signal generated by the transmission signal generation unit by radio,
 wherein a roll-off factor of the waveform shaping filter is set to be 0 when the radio access scheme set by the radio access scheme setting unit is the multicarrier scheme, and the roll-off factor of the waveform shaping filter is set based on a radius of a cell covered by the base station apparatus when the radio scheme is the single-carrier scheme.

2. The user apparatus as claimed in claim 1, wherein the waveform shaping filter performs waveform shaping according to the roll-off factor reported from a base station apparatus.

3. The user apparatus as claimed in claim 1, wherein the radio access scheme setting unit sets the radio access scheme according to a switch signal reported from a base station apparatus.

4. The user apparatus as claimed in claim 3, wherein the switch signal is included in a broadcast channel.

5. The user apparatus as claimed in claim 3, wherein the switch signal is included in a physical downlink control channel.

6. A base station apparatus that communicates with a user apparatus to which radio access schemes of a single-carrier scheme and a multicarrier scheme are applied, comprising:
 a radio access scheme setting unit configured to set a radio access scheme to be used by the user apparatus;
 a waveform shaping condition setting unit configured to set a roll-off factor based on which the user apparatus performs waveform shaping, according to the radio access scheme set by the radio access scheme setting unit; and
 a reporting unit configured to report, by radio, information indicating the radio access scheme set by the radio access scheme setting unit and the roll-off factor set by the waveform shaping condition setting unit,
 wherein the waveform shaping condition setting unit sets the roll-off factor to be 0 when the radio access scheme set by the radio access scheme setting unit is the multicarrier scheme, and the waveform shaping condition setting unit sets the roll-off factor based on a radius of a cell covered by the base station apparatus when the radio access scheme is the single-carrier scheme.

7. The base station apparatus as claimed in claim 6, wherein the radio access scheme setting unit determines the radio access scheme to be used by the user apparatus based on a difference between the base station apparatus and another base station apparatus located near the base station apparatus.

8. The base station apparatus as claimed in claim 6, wherein the radio access scheme setting unit determines the radio access scheme to be used by the user apparatus based on a configuration of a cell covered by the base station apparatus.

9. The base station apparatus as claimed in claim 8, wherein the configuration of the cell includes a macro cell, a micro cell, an indoor cell and a hot spot cell.

10. The base station apparatus as claimed in claim 6, wherein the radio access scheme setting unit determines the radio access scheme to be used by the user apparatus according to types of physical channels.

11. The base station apparatus as claimed in claim 6, wherein the reporting unit reports, using a broadcast channel, the information indicating the radio access scheme set by the radio access scheme setting unit and the roll-off factor set by the waveform shaping condition setting unit.

12. The base station apparatus as claimed in claim 6, wherein the radio access scheme setting unit determines the radio access scheme to be used by the user apparatus based on radio resources to be assigned to the user apparatus.

13. The base station apparatus as claimed in claim 6, wherein, when the user apparatus requests transmission of uplink data, the radio access scheme setting unit determines the radio access scheme to be used by the user apparatus based on QoS required for the uplink and on uplink channel quality of the user apparatus.

14. The base station apparatus as claimed in claim 6, wherein the waveform shaping condition setting unit sets the roll-off factor based on a transmission format to be used by the user apparatus when the radio access scheme set by the radio access scheme setting unit is the single-carrier scheme.

15. The base station apparatus as claimed in claim 6, wherein the reporting unit reports, using a physical downlink control channel, information indicating the radio access scheme set by the radio access scheme setting unit and the roll-off factor set by the waveform shaping condition setting unit.

16. A communication control method in a radio communication system including a user apparatus to which radio access schemes of a single-carrier scheme and a multicarrier scheme are applied, and a base station apparatus that communicates with the user apparatus, comprising:

a step in which the base station apparatus sets a radio access scheme to be used by the user apparatus;

a step in which the base station apparatus sets a roll-off factor based on which the user apparatus performs waveform shaping, according to the radio access scheme set in the step of setting the radio access scheme;

a step in which the base station apparatus reports, by radio, information indicating the radio access scheme set in the step of setting the radio access scheme and the roll-off factor;

a step in which the user apparatus sets the radio access scheme according to the radio access scheme reported from the base station apparatus;

a conversion step in which the user apparatus performs discrete Fourier transform on a modulated symbol sequence or performs serial parallel conversion on the modulated symbol sequence according to the radio access scheme set by the step of setting the radio access scheme;

a step in which the user apparatus assigns radio resources to the modulated symbol sequence on which discrete Fourier transform has been performed in the conversion step or to the demodulated symbol sequence on which serial parallel conversion has been performed so as to generate a signal in the frequency domain;

a step in which the user apparatus performs waveform shaping on the signal in the frequency domain generated by the step of generating the signal of the frequency domain according to the roll-off factor reported by the base station apparatus;

a step in which the user apparatus performs inverse fast Fourier transform on the signal in the frequency domain on which waveform shaping has been performed by the step of waveform shaping so as to generate a transmission signal; and a step in which the user apparatus transmits the transmission signal generated by the step of generating the transmission signal by radio, wherein in the step of setting the roll-off factor, the base station apparatus sets the roll-off factor to be 0 when the radio access scheme is the multicarrier scheme, and the base station apparatus sets the roll-off factor based on a radius of a cell covered by the base station apparatus when the radio access scheme is the single-carrier scheme.

* * * * *